United States Patent [19]
d'Auria et al.

[11] 3,977,764
[45] Aug. 31, 1976

[54] VARIABLE COUPLER FOR OPTICAL FIBERS

[75] Inventors: Luigi d'Auria; Benoit Le Guen; Erich Spitz, all of Paris, France

[73] Assignee: Thomson-CSF, Paris, France

[22] Filed: Sept. 8, 1975

[21] Appl. No.: 611,252

[30] Foreign Application Priority Data
Sept. 13, 1974  France............................. 74.31151

[52] U.S. Cl. .................... 350/96 C; 350/96 WG; 350/169
[51] Int. Cl.² .......................................... G02B 5/14
[58] Field of Search ............ 350/96 R, 96 B, 96 C, 350/169, 96 WG

[56] References Cited
UNITED STATES PATENTS

| | | | |
|---|---|---|---|
| 3,870,396 | 3/1975 | Racki et al. | 350/96 WG |
| 3,874,779 | 4/1975 | Thiel | 350/96 WG |
| 3,937,560 | 2/1976 | Milton | 350/96 C |

OTHER PUBLICATIONS
"Simple Coupler Taps Fiber-Obtics Cables", Electronics, Dec. 20, 1973, pp. 30-31.
Lynch, R. J., "Fiber Optic Connectors", IBM Technical Disclosure Bulletin, vol. 13, No. 2, July 1970, pp. 533-534.

Primary Examiner—John K. Corbin
Assistant Examiner—Rolf Hille
Attorney, Agent, or Firm—Cushman, Darby & Cushman

[57] ABSTRACT

The present invention relates to a variable coupler for optical fibers, which can also operate as a mixer. This variable coupler comprises an optical system which concentrates the divergent radiation issuing from the output orifice of a transmitter fiber, on the input orifice of a first receiver fiber, and optical means (flat mirror, prism, plate with parallel faces, for example) capable of performing a translatory motion, which make it possible to intercept a variable fraction of said radiation and direct it on to the input orifice of a second receiver fiber.

7 Claims, 5 Drawing Figures

VARIABLE COUPLER FOR OPTICAL FIBERS

The present invention relates to variable couplers for fibre optics.

Throughout the following description it should be understood that the term fibre is intended to indicate not merely a single fibre but also a bunch of fibres, and that of course the individual fibres associated within the bunch all carry the same information on the same carrier.

The device proposed here provides a simple and economic solution to the problem of variable pick-off of part of the signal circulating through an optical communications line, and makes it possible to vary the pick-off ratio between 0 and 100 %.

The significance of this kind of device becomes apparent, for example, in the situation where optical communication is to be established between a single transmitter and several receivers located at different distances. If, despite the variable attenuation which is due to the differing transmission distances, it is desired that the signals received by the various receivers should have the same amplitude, then it is necessary to pick off the signal emitted by the source, in different ratios; several couplers in accordance with the invention will therefore be arranged in series, each adjusted to a pick-off ratio corresponding to the distance of the associated receiver.

The invention proposes that in order to effect this variable pick-off, the fibre should be interrupted at the location at which pick-off is to take place and the connection between the exit orifice of the transmitter-side piece of fibre and the entry orifice of the receiver-side piece of fibre, restored by optical focussing means which form the image of the exit orifice on the entry orifice and are of sufficient aperture for the divergent beam emanating from the transmitter fibre to be picked-off in full; variable pick-off means, of reflective or refractive type, are then introduced in the path of the light rays between the two orifices, input and output, and make it possible to project on to the input orifice of a third fibre part of the radiation coming from the emitter-side fibre.

The invention, together with its features, advantages and objects, can be better understood from the ensuing detailed description when read in conjunction with the attached drawings in which.

Figure 1:
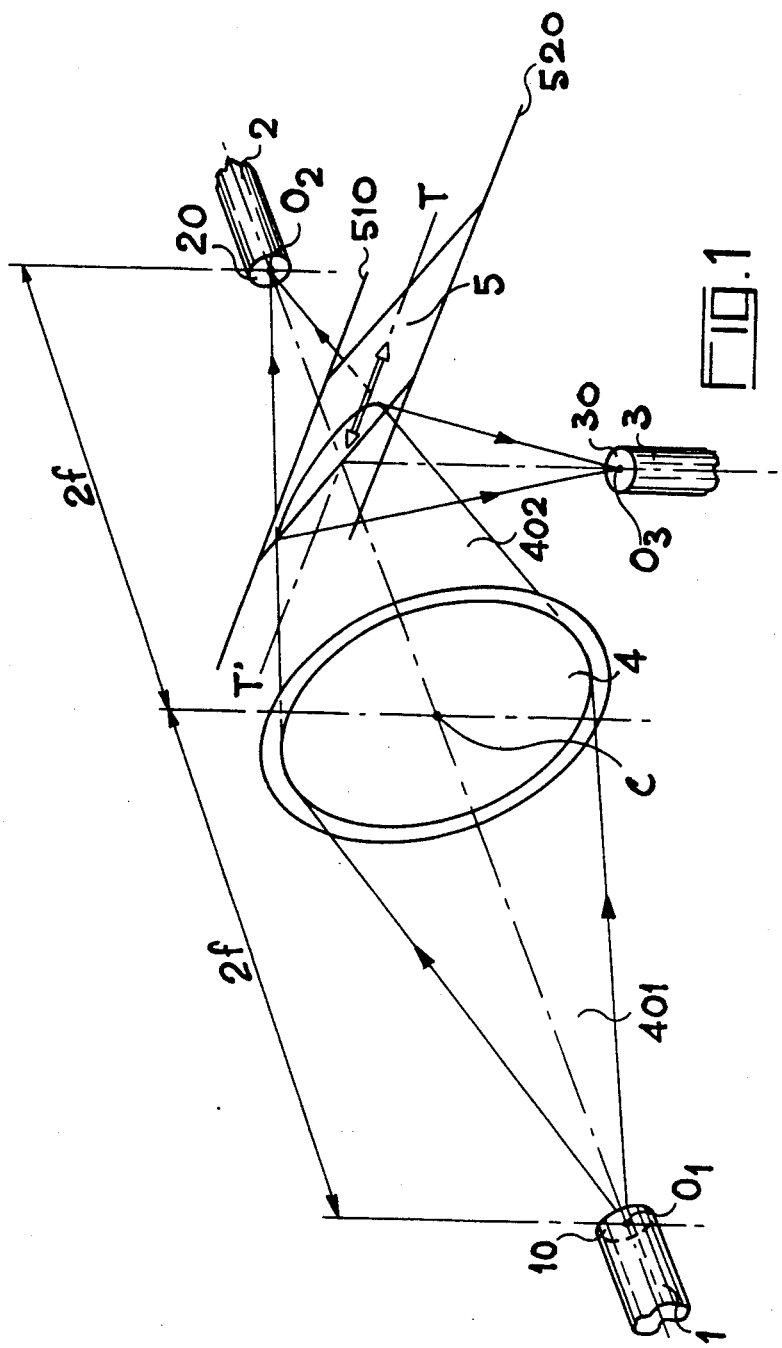
FIG. 1 illustrates a first embodiment of the device in accordance with the invention, utilising a single objective lens and a flat mirror.

In FIG. 1, which relates to the first embodiment of the device in accordance with the invention, there can be seen three identical optical fibres: the fibre 1 is the transmitter fibre, the fibres 2 and 3 are the receiver fibres; the ends of the fibres 1 and 2 are aligned on the same axis $O_1O_2$ passing through the centre of the respective orifices 10 and 20 of these fibres. Said axis $O_1O_2$ is the optical axis of an objective lens 4 whose optical centre C is located at the mid-point of the length $O_1O_2$; the length $O_1O_2$ is chosen to be equal to four times the focal length F of the objective lens 4 which, operating thus at a magnification of −1, forms upon the orifice 20 an image of the orifice 10 of the same size as the latter. A flat mirror 5, the reflective part of which is orientated towards the objective lens 4, is disposed in an inclined attitude (45° in the case of FIG. 1) relatively to the axis $O_1O_2$; this mirror can displace in its own plane to the left or right by a translatory motion parallel to TT', sliding on two slides 510 and 520, parallel to TT', in order to do so. The end of the fibre 3 is disposed symmetrically to that of the fibre 2, in relation to the plane in which the mirror 5 displaces; the orifice 20 is thus the image, viewed in the mirror 5, of the orifice 30, centred at $O_3$, of the fibre 3, this whatever the position of the mirror 5. Depending upon its position, the mirror 5 can be located either completely outside the light beam 402 focussed by the objective lens 4 on the orifice 20, this making it possible for the fibre 2 to pick up all the radiation emitted by the fibre 1, or can partially (as shown in FIG. 1) or wholly occult this beam; in the latter case, part or all of the radiation emitted by the fibre 1 is concentrated on the orifice 30 of the fibre 3. By sliding the mirror 5 it is thus possible to pick-off for the benefit of the fibre 3, a fraction varying between 0 and 100 %, of the light radiation circulating from the fibre 1 to the fibre 2.

The energy losses in this kind of coupler can be extremely low; to reduce them to the maximum possible extent, the objective lens is equipped with antireflecting coatings and its entry pupil has a sufficiently large diameter to receive the whole of the divergent beam emitted by the fibre 1. The apex half-angle of the conical beam 401 emitted by the orifice 10 of a fibre approximately 50 microns in diameter, utilising multimode propagation, varies between 5° for a very low-loss fibre and a miximum value of 30°, thus making it possible to calculate the minimum aperture which the objective lens should have, the diameter of the latter being of the order of 5 mm.

Figure 2:
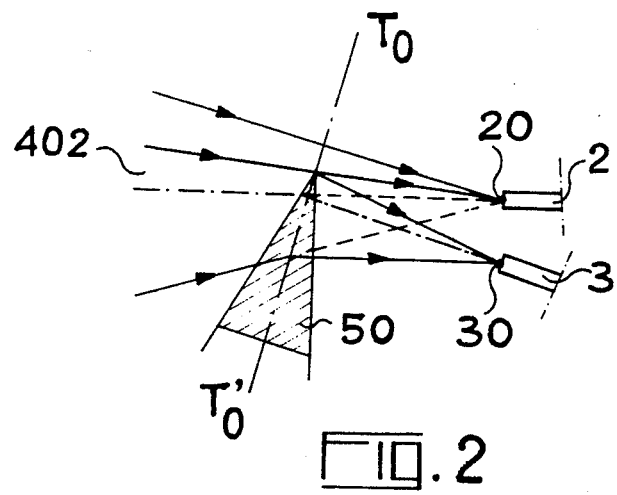
FIG. 2 illustrates a second embodiment of the device in accordance with the invention, utilising a single objective lens and a prism.
Figure 3:
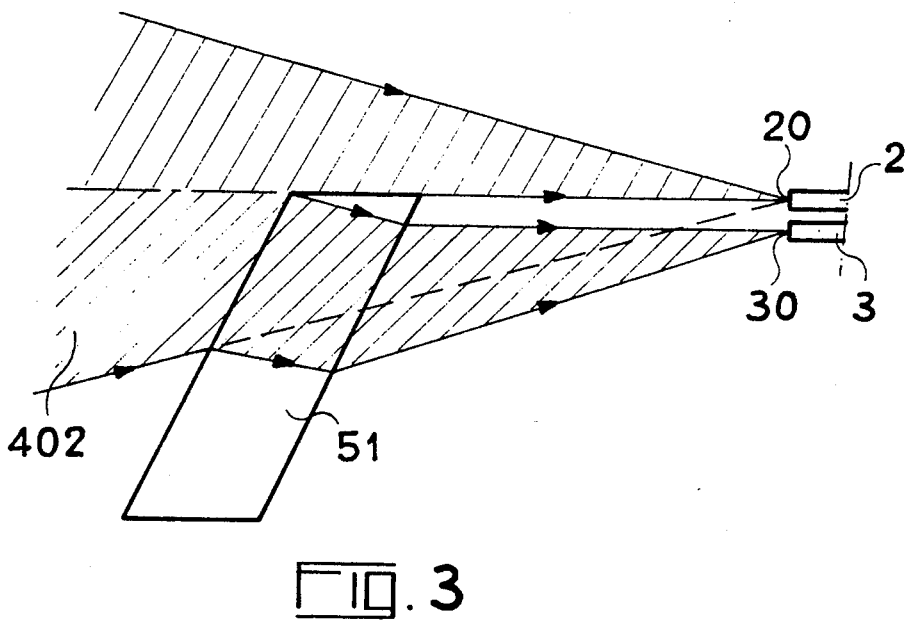
FIG. 3 illustrates a third embodiment of the device in accordance with the invention, utilising a single objective lens and a plate with parallel faces.

FIGS. 2 and 3 relate to two other embodiments of the device in accordance with the invention in which the overall device of FIG. 1, formed by the three fibres 1, 2 and 3 and the objective lens 4 of magnification −1, has been retained but in which the mobile mirror 5 constituting the variable pick-off means has been replaced by refractive elements. In these two figures, the illustration has been confined to the beam 402 of convergent light issuing frm the objective lens 4, the pick-off means used and the ends of the fibres 2 and 3.

In FIG. 2, there can be seen a triangular-section prism 50 partially introduced into the path of the convergent beam 402 and orientated in such a manner that it produces minimum deflection in the centre ray of the beam which is coincidental with the optical axis $O_1O_2$. Part of the rays of the beam propagate directly to penetrate the orifice 20 of the fibre 2; the other part, encountering the prism 50, is deflected from its trajectory and enters the fibre 3 at the orifice 30. The prism can move in a translatory sense along the axis $T_0T_0'$ which is contained in the plane of symmetry of the prism and is perpendicular to its apex.

In FIG. 3, the prism of FIG. 2 has been replaced by a plate 51 with parallel faces, inclined in relation to the axis of the beam. That portion of the convergent beam entering the plate 51, undergoes a translation in accordance with the thickness of the plate and the latter's inclination in relation to the axis, and enters the orifice 30 of the fibre 3. The plate at 51 can be translated either perpendiculary to the axis $O_1O_2$ or in the plane of its own faces.

In the case illustrated in FIG. 2, like that depicted in FIG. 3, the adjustment of the pick-off factor is effected by influencing the depth of penetration of the refractive element into the beam.

Although, in FIGS. 2 and 3, the double-reflecting means employed for pick-off have been shown arranged between the objective lens 4 and the orifices 20 and 30, the invention functions equally well if said same means are arranged between the orifice 10 and the objective lens 4.

FIGS. 1, 2 and 3 illustrate an optical system of magnification −1, which makes it possible to couple the fibres 1, 2 and 3 which have the same diameter $d$. By changing the magnification of the optical system, it becomes possible to couple to a fibre 1 of diameter $d$, two fibres 2 and 3 having identical diameters $d'$, albeith different from $d$.

Figure 4:
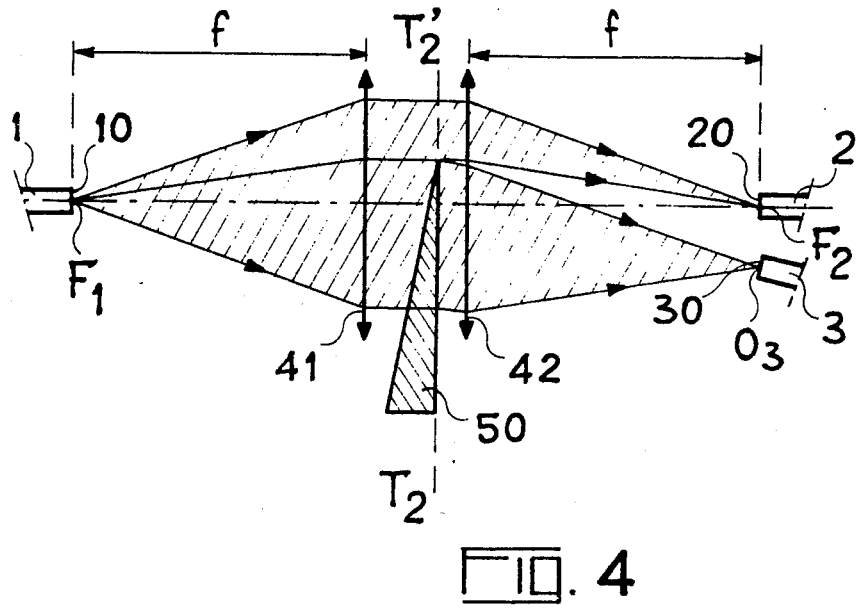
FIG. 4 illustrates a fourth embodiment of the device in accordance with the invention, utilising two objective lenses and a prism.

FIG. 4 illustrates a fourth example of the invention. Two objective lenses 41 and 42 having the same focal length $f$ and coincidental optical axes $O_1O_2$, constitute the optical focussing means and replace the single objective lens 4 of FIG. 1. The respective orifices 10 and 20 of the fibres 1 and 2 are centred at $F_1$ and $F_2$, the respective foci of the objective lenses 41 and 42. The emergent radiation from the orifice 10 of the fibre 1, in the form of a divergent beam, is converted into a parallel beam by the objective lens 41. The prism 50, which is mobile in the direction $T_2T_2'$ perpendicular to the optical axis $O_1O_2$, intercepts a variable part of these parallel rays. That part of the rays not intercepted by the prism 50 enters the objective lens 42 parallel to its optical axis and forms an image of the orifice 10, which is centred at the focus $F_2$, that is to say on the orifice 20 of the fibre 2. That portion of the rays intercepted by the prism 50 furnishes a second parallel beam which enters the objective lens 42 making a certain angle with its optical axis, and is consequently concentrated at a point $O_3$ located in the focal plane of the objective lens 42 but offset from the optical axis; the orifice 30 of the fibre 3 is centred at the point $O_3$ and accordingly picks-off that portion of the radiation issuing from the fibre 1, which is deflected by the prism 50. This device, compared with that shown in FIG. 2, requires an additional objective lens but makes it possible, by contrast, to operate the prism in parallel beam fashion and therefore under conditions of perfect stigmatism.

Figure 5:
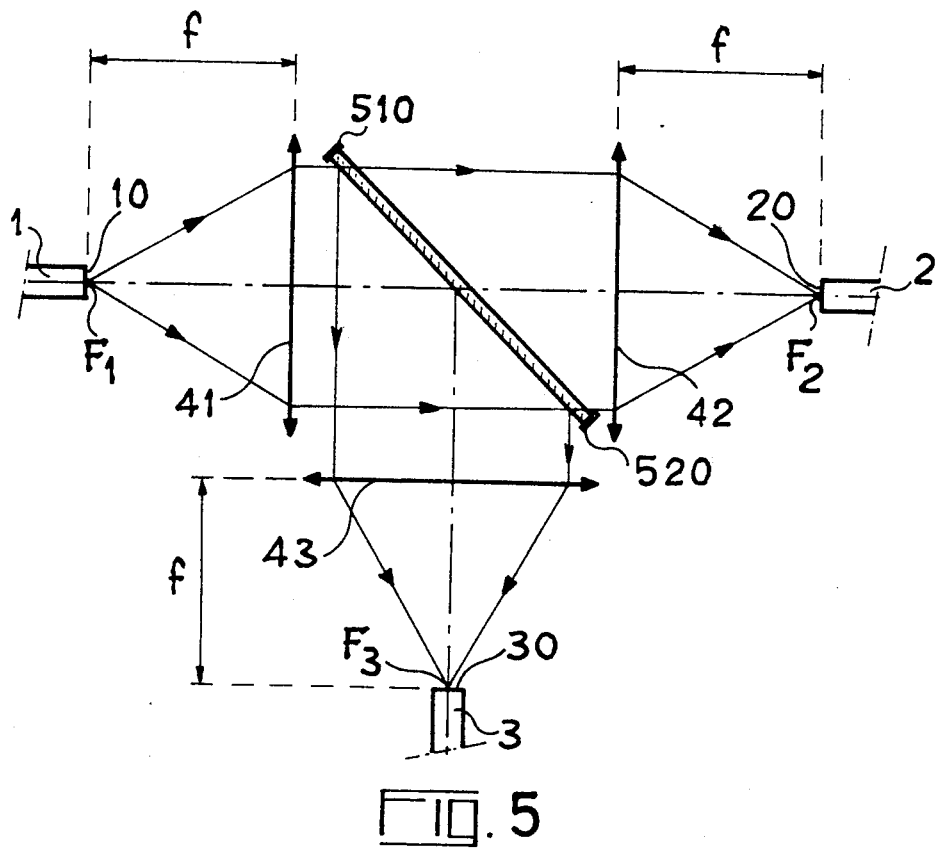
FIG. 5 illustrates a fifth embodiment of the device in accordance with the invention, utilising three objective lenses and a flat mirror.

A fifth embodiment has been shown in FIG. 5 where, in the case of the fibres 1 and 2 and the objective lenses 41 and 42, the same arrangement is once again encountered as in FIG. 4, but where the mobile prism 40 is replaced by a mirror 5 inclined at 45° in relation to the axis $F_1F_2$ and mobile in a translational sense, in its own plane, by sliding along two slides 510 and 520; in FIG. 5, the direction of translation of the mirror 5 has been shown perpendicular to the plane of the figure. That fraction of the parallel light beam intercepted by the mirror 5 is picked-off by an objective lens 43, identical to the two objective lenses 41 and 42, which projects it on to the orifice 30 of the fibre 3, said orifice being centred on the point $F_3$ which is the image of the point $F_1$.

The coupler which forms the object of the present invention can also be utilised as a mixer, it then makes it possible to introduce in variable proportion into a fibre 1 doing duty as the receiver fibre, the signals coming from two fibres 2 and 3 which then do duty as transmitter fibres.

What we claim is:

1. A variable coupler for optical fibres, for distributing the radiation issuing from the orifice of a first fibre, between the orifices of a second and a third fibre, and comprising optical focussing means for projecting a first image of said orifice of said first fibre, onto said orifice of said second fibre, and radiation pick-off means co-operating with at least part of said optical focussing means for projecting a second image of said orifice of said first fibre, onto said orifice of said third fibre; said radiation pick-off means being movable by translation for intercepting a fraction variable between 0 and 1 of said radiation issuing from said orifice of said first fibre.

2. A coupler as claimed in claim 1, wherein said pick-off means comprise a flat mirror.

3. A coupler as claimed in claim 2, wherein said optical focussing means comprise a first and a second objective lens having a same optical axis; said orifices of said first and second fibres being respectively located at the foci of said first and second objective lenses; said flat mirror being arranged between said first and second objective lenses in a plane making an angle substantially equal to 45° with said optical axis, and being capable of translating in said plane; said coupler further comprising a third objective lens for receiving the radiation fraction intercepted by said mirror, and projecting said fraction onto said orifice of said third fibre.

4. A coupler as claimed in claim 1, wherein said pick-off means comprise a transparent, triangular-section prism.

5. A coupler as claimed in claim 4, wherein said optical focussing means comprise a first and a second objective lens having a same optical axis, said orifice of said first fibre being located in the object focal plane of said first objective lens and said orifices of said second and third fibres being located in the image focal plane of said second objective lens; said prism being arranged between said first and second objective lenses and being capable of translating perpendicularly to said optical axis.

6. A coupler as claimed in claim 1, wherein said pick-off means comprise a transparent plate with parallel faces.

7. A coupler as claimed in claim 1, wherein said optical focussing means comprise an objective lens with a magnification of −1.

* * * * *